United States Patent [19]

Sagara et al.

[11] Patent Number: 4,482,787
[45] Date of Patent: Nov. 13, 1984

[54] TELEPHONE-CALL PROHIBIT CIRCUIT

[75] Inventors: Iwao Sagara; Keisuke Kataoka, both of Tokyo, Japan

[73] Assignee: OKI Electric Industry Co. Ltd., Japan

[21] Appl. No.: 455,600

[22] Filed: Jan. 4, 1983

[51] Int. Cl.³ .............................................. H04M 1/66
[52] U.S. Cl. ............................. 179/90 D; 179/18 DA
[58] Field of Search .............. 179/90 D, 90 B, 90 BB, 179/90 BD, 189 D, 18 DA, 81 R; 340/825.31

[56] References Cited
U.S. PATENT DOCUMENTS

| | | | |
|---|---|---|---|
| 4,234,764 | 11/1980 | Beebe | 179/90 D |
| 4,314,108 | 2/1982 | Sharuit | 179/90 D |

*Primary Examiner*—Stafford D. Schreyer
*Attorney, Agent, or Firm*—Martin Novack

[57] ABSTRACT

A circuit for preventing a telephone set from being used without approval, the telephone set including a handset, telephone lines coupled to the handset, a dial pulse signal generator and hookswitches for coupling the telephone lines to the handset and for cooperating with the handset. A circuit is provided for converting the dial pulse signals into a binary code, a prohibit circuit is provided for generating a prohibit signal which prohibits a telephone call when the binary codes corresponding to prohibited dial numbers are input thereto, and an unlock circuit is provided for generating during a predetermined period a control signal which allows a telephone call when the binary codes corresponding to secret dial numbers are input thereto. A transfer switching means is provided for selectively coupling the converting circuit to either the prohibit circuit or to the unlock circuit and for cooperating with the hookswitches. A gate circuit is provided for preventing the passing of the prohibit signal of the prohibit circuit in response to the control signal of the unlock circuit, and a switch is provided for breaking the telephone lines in response to the prohibit signal from the gate circuit. A reset signal is generated to the prohibit circuit when the hookswitches are closed, whereby the prohibit circuit is reset to its initial condition.

12 Claims, 5 Drawing Figures ity # TELEPHONE-CALL PROHIBIT CIRCUIT

BACKGROUND OF THE INVENTION

The present invention relates to a telephone-call prohibit circuit for preventing a telephone set from being used without approval.

The advancement of present-day communication technology has made possible direct long distance calls to other countries through automatic telephone dialing. For this purpose telephone sets can be used without difficulties. However, if the telephone set is frequently used for long distance calls without notice, its subscriber may be subjected to an extremly high telephone charge. In general, the prior art central-office (or PBX) switching equipment has a device which automatically can prohibit long distance calls that do not have approval. However, this sort of device has been impractical to mount in a desk-type telephone set for home use. It would be desirable to have a telephone set which includes in it a telephone-call prohibit circuit and in which prohibited telephone call numbers can be easily changed by telephone subscribers.

SUMMARY OF THE INVENTION

It is an object of the present invention to provide a telephone-call prohibit circuit which can automatically prevent a particular telephone call prohibited by a telephone owner.

It is another object of the present invention to provide a telephone-call prohibit circuit which can be easily built in a conventional telephone set.

It is still another object of the present invention to provide a telephone-call prohibit circuit of which a secret code for prohibiting a particular telephone call can be easily changed by the subscriber.

The above and other objects are attained by a telephone-call prohibit circuit for preventing a telephone set from being used without approval, the telephone set including a handset, telephone lines coupled to the handset, means for generating dial pulse signals, and hookswitches for coupling the telephone lines to said handset and for cooperating with the handset, the telephone-call prohibit circuit comprising means (24, 130) for converting the dial pulse signals into a binary code, a prohibit circuit (120) for generating a prohibit signal which prohibits a telephone call when the binary codes corresponding to prohibited dial number are inputted thereto, an unlock circuit (110) for generating during a predetermined period a control signal which allows a telephone call when the binary codes corresponding to secret dial numbers are inputted thereto, a transfer switching means (132) for selectively coupling the converting means (24, 130) to either the prohibit circuit (120) or to the unlock circuit (110) and for cooperating with the hookswitches (25), a gate circuit (138) for preventing the passing of the prohibit signal of the prohibit circuit (120) in response to the control signal of the unlock circuit (110), a switching means (144) for breaking the telephone lines in response to the prohibit signal from the gate circuit (138), a reset means (136) for generating a reset signal to the prohibit circuit (120) when the hookswitches are closed, whereby the prohibit circuit (120) is reset to its initial condition, and a power source (150) for supplying energy to each circuit of the telephone-call prohibit circuit.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
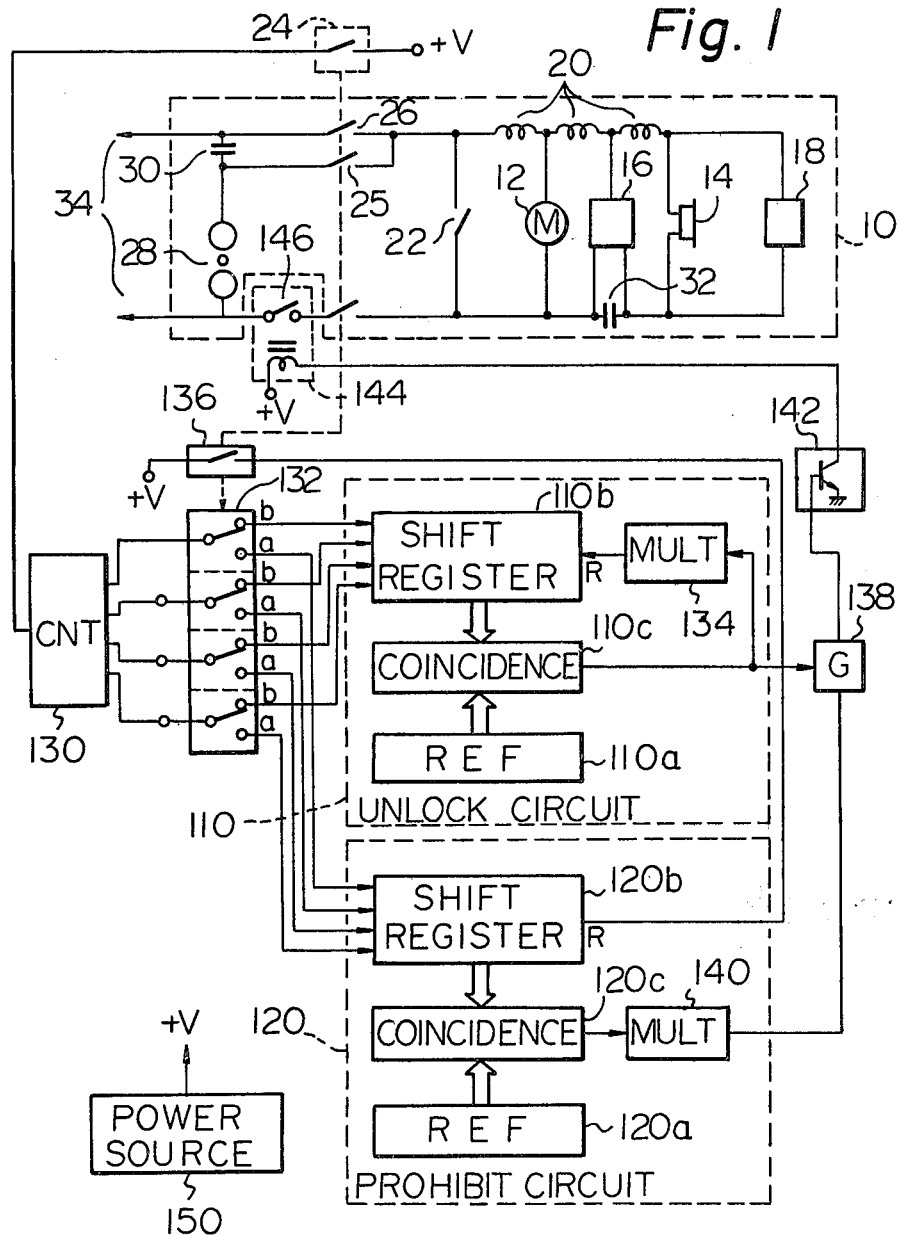
FIG. 1 is the schematic diagram of a telephone set including a telephone-call prohibit circuit according to the present invention.

FIG. 1 shows a block diagram of a telephone set including the telephone-call prohibit circuit according to the present invention.

In the figure, the reference numeral 10 is a conventional telephone set circuit, in which the reference numeral 12 is a microphone, 14 is a receiver, 16 is a balanced circuit, 18 is a varistor, 20 is a transformer with three windings, 28 is a ringing bell, 30 and 32 are decoupling capacitors, 34 is a telephone line coupled with an telephone exchange system, 22 is a switch for short-circuiting the telephone lines 34 during dialing, 25 is a hookswitch which couples the telephone set circuit 10 with the telephone line 34 when a handset 100a (See FIG. 2) is lifted, and 26 is a dial switch for providing dial pulse signals to the telephone line 34 when a finger wheel 26a (See FIG. 2) is dialed.

Figure 2:
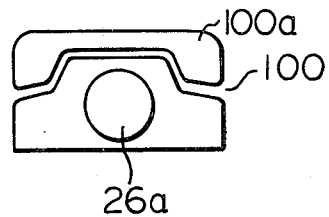
FIG. 2 shows the external appearance of the telephone set of FIG. 1.

The microphone 12 and the receiver 14 are mounted in the handset 100a of FIG. 2. The transformer 20, the balanced circuit 16, and the decoupling capacitor 32 compose an antisidetone circuit which prevents the sound signal from the microphone 12 to the receiver 14. The dial switch 26 provides dial pulses corresponding to the dialed telephone number, and is mechanically driven by the governor (not shown) which cooperates with the finger wheel 26a.

The present telephone-call prohibit circuit has an unlock circuit 110 for generating at a predetermined period the control signal which allows the telephone set 100 to be used when a secret code corresponding to particular dial numbers is inputted thereto, and a prohibit circuit 120 for generating a prohibit signal which prohibits a telephone call when a secret code corresponding to particular prohibited dial numbers is inputted thereto. The present telephone-call prohibit circuit also includes a detector 24 for indirectly detecting the pulse signals on the telephone lines 34, a counter 130 for converting the signals detected by the detector 24, such as a reed switch, into a binary code, a relay 144 connected in the telephone line 34, a transfer switch 132 for selectively sending the binary code from the counter 130 to either the unlock circuit 110 or the prohibit circuit 120.

Also the present telephone-call prohibit circuit includes a switch 136 for generating a reset signal, a gate circuit 138 for passing selectively the prohibit signal from the prohibit circuit 120, a driver circuit 142 for supplying a drive current to the relay 144, and a power unit such as a battery for supplying energy to the above-mentioned circuits without being supplied electric power from the telephone lines 34.

The reed switch 24 can be operated by the permanent magnets (not shown) placed under the finger wheel 26a. In addition, the reed switch 24 may be replaced by a telephone pickup for receiving the vibrating sound of the dial pulse switch 26.

The unlock circuit 110 has a binary code setting circuit 110a, such as a digit switch or a ROM, for setting a particular secret code, a memory circuit 110b, such as a shift register, for sequentially storing the binary code from the transfer switch 132, a coincidence circuit or a comparator 110c for generating the control signal when the information content of the memory circuit 110b coincides with the information content of the binary code setting circuit 110a, and a timer circuit 134, such as a monostable multivibrator, for providing the control signal for a predetermined time, for example about 20 seconds, by resetting the memory circuit 110b.

The prohibit circuit 120 has a binary code setting circuit 120a, such as a digit switch or a ROM, for setting a particular code corresponding to telephone number, for example a long distance call number or an international call number, of which dialings are prohibited, a memory circuit 120b, such as a shift register, for storing sequentially the binary code from the transfer switch 132, a coincidence or a comparator 120c for generating the prohibit signal when the information content of the memory circuit 120b coincides with the information content of the binary code setting circuit 120c, a timer circuit 140, such as a monostable multivibrator, for providing the prohibit signal for a predtermined time, for example, about 0.6 seconds.

The circuit according to this invention operates as follows:

(a) Normal call operation

At first, it should be noted that when the handset 100a of the telephone set 100 is in rest, the gate circuit 138 is in an ON (or conductive) state because of the absence of the control signal to the gate circuit 138.

When the handset 100a is lifted for a telephone call, the hookswitches 25 are closed to couple the telephone set circuit 10 with the telephone lines 34, while the transfer switch 132 is changed to the contacts (a) and the switch 136 is closed to provide a reset signal to the shift register 120b.

In this case, since a particular code is not inputted to the shift register 110b, the comparator 110c does not send a control signal to the gate circuit 138. Therefore, the gate circuit is always in an ON state.

Next, when the finger wheel 26a is dialed, the dial switch 26 generates dial pulses corresponding to dialed numbers, while the reed switch 24 detects the dial pulses. The detected dial pulses are converted into four-bit binary code by the counter 130, and then the four-bit code is transferred to the shift register 120b through the switch 132. The content of the shift register 120b is compared with the content of the code setting circuit 120a by the comparator 120c. If the content of the shift register 120b does not coincide with the content of the code setting circuit 120a, the comparator 120c does not output a prohibit signal to the gate circuit 138. For this reason, the relay 144 operates to close the contact 146, so that the telephone set can be normally used without prohibiting the telephone call.

(b) Lock operation

When a prohibit call number, for example, a particular long distance call number or a particular international call number is dialed in lifting the handset, the comparator 120c outputs the prohibit signal because the content of the shift register 120b coincides with the content of the code setting circuit 120a. The prohibit signal passes through the gate circuit 138 being in an ON state, abd then drives the driver circuit 142. This results in the breaking of the telephone lines 34 and in the prohibiting of the telephone call.

(c) Unlock operation

To phone to a prohibit call number, the dial number corresponding to a secret code must be dialed in resetting the handset 100a. Since the contacts of the transfer switch 132 are in (b) positions, the secret code is transferred to the shift register 110b. Then, the secret code coincides with that of the code setting circuit 110a, so that the comparator 110c sends a prohibit signal for about 20 seconds to make the gate circuit 138 in an OFF condition. Next, after the handset 100a is lifted, the desired telephone call must be dialed within about 20 seconds.

Then, since the output code of the shift register 120b coincides with the secret code of the code setting circuit 120a, the comparator 120c outputs the prohibit signal to the gate circuit 138. However, the prohibit signal cannot be sent to the driver circuit 142 because of the OFF condition of the gate circuit 138. This results in the continuation of the closed contact 146 of the relay 144, and makes the normal long distance or international calls possible, in spite of the prohibited telephone call.

In addition, this invention can be used in a push-button telephone set having a push-button dialing pad for generating dial tones corresponding to dial numbers, in place of the finger wheel 26a in FIG. 2. In this case, a conventional push-button dialing pad may need a little bit of modification in its structure.

Figure 3A:
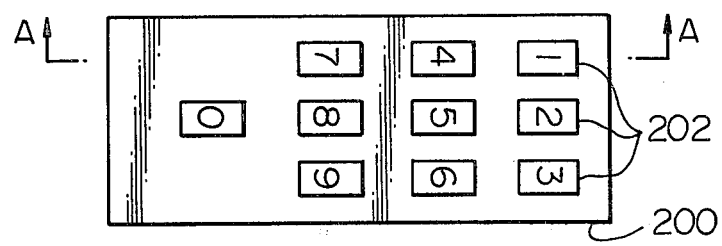
FIG. 3A shows the plan view of a push-button key pad used in the telephone-call prohibit circuit according to the present invention.
Figure 3B:
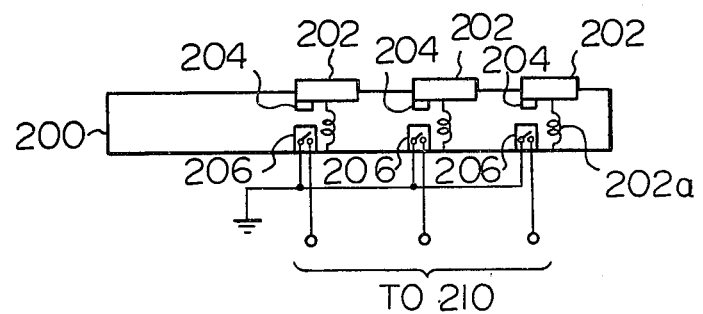
FIG. 3B is the cross-sectional view at the line A—A of FIG. 3A.
Figure 3C:
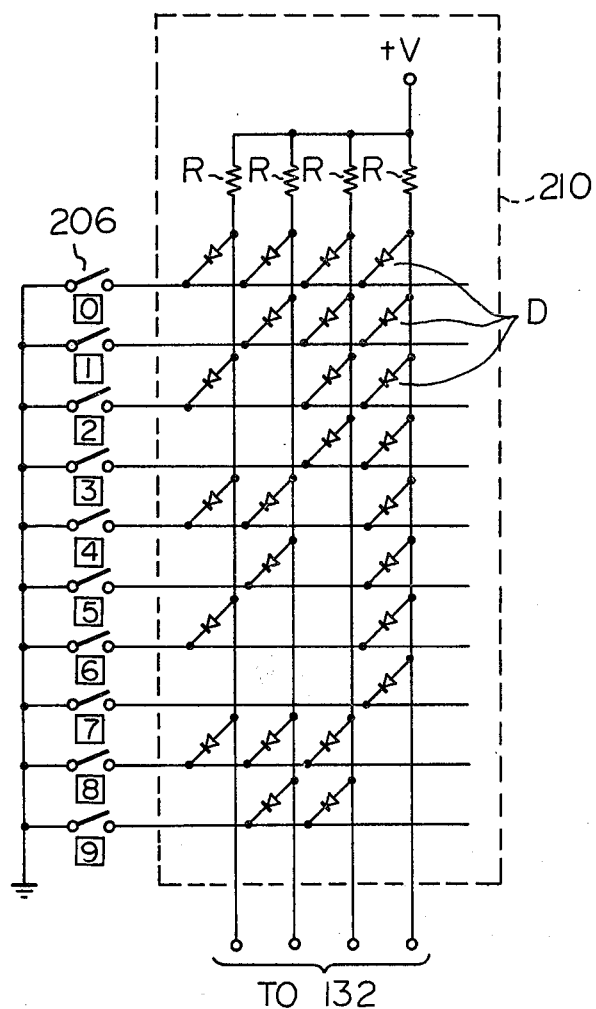
FIG. 3C is the decoder coupled to the push-button key pad of FIG. 3A.

FIGS. 3A and 3B, for example, show the push-button dialing pad including keys 202 with magnets 204, springs 202a in a housing 200, and additional switches 206 such as reed switches driven by the magnets 204. Therefore, the reed switches 206 cooperate with the keys 202. Each terminal of the reed switches 206 is connected to a decoder 210 of FIG. 3C of which the outputs are connected to the transfer switch 132 of FIG. 1. The decoder 210 for providing a binary code is supplied with the exclusive power source 150 in FIG. 1.

As described above in detail, the present telephone-call prohibit circuit allows only subscribers with the knowledge of an unlock code to have prohibited telephone calls.

From the foregoing, it will now be apparent that a new and improved telephone-call prohibit circuit has been discovered. It should be understood of course that the embodiments disclosed are merely illustrative and are not intended to limit the scope of the invention. Reference should be made to the appended claims, therefore, rather than the specification as indicating the scope of the invention.

What is claimed is:

1. A telephone-call prohibit circuit for preventing a telephone set from being used without approval, said telephone set including a handset, telephone lines coupled to said handset, means for generating dial pulse signals, and hookswitches for coupling said telephone lines to said handset and for cooperating with said handset, said telephone-call prohibit circuit comprising:

means (24, 130) for converting said dial pulse signals into a binary code, a prohibit circuit (120) for generating a prohibit signal which prohibits a telephone call when said binary codes corresponding to prohibited dial numbers are inputted thereto, an unlock circuit (110) for generating during a predetermined period a control signal which allows a telephone call to said prohibited dial numbers when said binary codes corresponding to secret dial numbers are inputted thereto, a transfer switching means (132) for selectively coupling said converting means (24, 130) to either said prohibit circuit (120) or to said unlock circuit (110) and for cooperating with said hookswitches (25), a gate circuit (138) for preventing the passing of said prohibit signal of said prohibit circuit (120) in response to said control signal of said unlock circuit (110), a switching means (144) for breaking said telephone lines in response to said prohibit signal from said gate circuit (138), a reset means (136) for generating a reset signal to said prohibit circuit (120) when said hookswitches are closed, whereby said prohibit circuit (120) is reset to its initial condition, and a power source (150) for supplying energy to each circuit of said telephone-call prohibit circuit.

2. A telephone-call prohibit circuit according to claim 1, wherein said dial pulse detecting means comprises a detector (24) for detecting said dial pulse signals, and a counter (130) for converting said dial pulse signals into a binary code.

3. A telephone-call prohibit circuit according to claim 1, wherein said prohibit circuit (120) comprises a memory means (120b) for sequentially storing said binary codes, a code setting circuit (120a) for setting a predetermined prohibit code corresponding to said prohibited dial numbers, a coincidence circuit (120c) for generating an output signal when the information content of said memory means (120b) coincides with the information content of said code setting circuit (120a), and a timer circuit (140) for generating said prohibit signal to said gate circuit in response to said output signal, said prohibit signal having a pulse width shorter than that of said control signal.

4. A telephone-call prohibit circuit according to claim 3, wherein said memory means (120b) is a shift register.

5. A telephone-call prohibit circuit according to claim 3, wherein said code setting circuit (120a) is a digit switch.

6. A telephone-call prohibit circuit according to claim 3, wherein said timer circuit (140) is a monostable multivibrator.

7. A telephone-call prohibit circuit according to claim 1, wherein said unlock circuit (110) comprises a memory means (110b) for sequentially storing said binary codes, a code setting circuit (110a) for setting a predetermined unlock code corresponding to said secret dial numbers, a coincidence circuit (110c) for generating an output signal when the information content of said memory means (110b) coincides with the information content of said code setting circuit (110a), and a timer circuit (134) for establishing a predetermined pulse width of said control signal and for resetting said memory means (120b).

8. A telephone-call prohibit circuit according to claim 7, wherein said memory means (110b) is a shift register.

9. A telephone-call prohibit circuit according to claim 7, wherein said code setting circuit (110a) is a digit switch.

10. A telephone-call prohibit circuit according to claim 7, wherein said timer circuit (134) is a monostable multivibrator.

11. A telephone-call prohibit circuit according to claim 1, wherein further comprising a driver circuit (142) for energizing to said switching means (144) by the output signal of said gate circuit (138).

12. A telephone-call prohibit circuit according to claim 1, wherein said dial pulse detecting means comprising a push-button dialing pad (200) having a plurality of keys corresponding to telephone dial numbers, and a decoder means (210) for sending a binary code to said transfer switching means (132) when each one of said keys is depressed.

* * * * *